(12) United States Patent
Montena et al.

(10) Patent No.: US 12,253,733 B2
(45) Date of Patent: Mar. 18, 2025

(54) MULTI-FIBER REEL AND ADAPTER ASSEMBLY

(71) Applicant: PPC BROADBAND, INC., East Syracuse, NY (US)

(72) Inventors: Noah P. Montena, Syracuse, NY (US); Peter Carapella, Fayetteville, NY (US); Cameron J. Adams, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/983,308

(22) Filed: Nov. 8, 2022

(65) Prior Publication Data

US 2023/0057307 A1 Feb. 23, 2023

Related U.S. Application Data

(63) Continuation of application No. 16/827,545, filed on Mar. 23, 2020, now Pat. No. 11,493,718.

(Continued)

(51) Int. Cl.
*B65H 75/14* (2006.01)
*B65H 75/28* (2006.01)
(Continued)

(52) U.S. Cl.
CPC ......... *G02B 6/4457* (2013.01); *G02B 6/3825* (2013.01); *G02B 6/3897* (2013.01);
(Continued)

(58) Field of Classification Search
CPC .... B65H 75/14; B65H 75/28; B65H 75/4471; B65H 2701/32; G02B 6/3825; G02B 6/3897; G02B 6/4457
See application file for complete search history.

(56) References Cited

U.S. PATENT DOCUMENTS 5,703,990 A 12/1997 Robertson et al.
6,220,413 B1 4/2001 Walters et al.
(Continued)

FOREIGN PATENT DOCUMENTS

CN 102576137 A 7/2012
TW 531523 B 5/2003
(Continued)

OTHER PUBLICATIONS

Search Report dated Jul. 20, 2020 in corresponding PCT Application No. PCT/US20/24337, 2 pages.
(Continued)

*Primary Examiner* — Ryan A Lepisto
(74) *Attorney, Agent, or Firm* — MH2 TECHNOLOGY LAW GROUP LLP (57) ABSTRACT

A multi-fiber reel and adapter assembly includes a base, a cable reel mounted to the base, and a plurality of adapters fixedly mounted to the base. The cable reel is configured to rotate relative to the base and the adapters, and each of the adapters is configured to couple a fiber optic cable from the cable reel with a fiber optic drop cable that is configured to run from the respective adapter to a location of an end user that is remote from the assembly.

20 Claims, 7 Drawing Sheets

Related U.S. Application Data (60) Provisional application No. 62/821,951, filed on Mar. 21, 2019.

(51) Int. Cl.
*B65H 75/44* (2006.01)
*G02B 6/38* (2006.01)
*G02B 6/44* (2006.01)

(52) U.S. Cl.
CPC ............ *B65H 75/14* (2013.01); *B65H 75/28* (2013.01); *B65H 75/4471* (2013.01); *B65H 2701/32* (2013.01)

(56) References Cited

U.S. PATENT DOCUMENTS

| | | | |
|---|---|---|---|
| 7,522,806 | B2 | 4/2009 | Hendrickson et al. |
| 7,680,386 | B2 | 3/2010 | Hurley |
| 7,756,379 | B2 | 7/2010 | Kowalczyk et al. |
| 7,894,701 | B2 * | 2/2011 | Kowalczyk ............ G02B 6/445 385/139 |
| 8,081,857 | B2 | 12/2011 | Nair et al. |
| 8,422,847 | B2 | 4/2013 | Kowalczyk et al. |
| 8,474,742 | B2 | 7/2013 | Smrha |
| 8,494,334 | B2 | 7/2013 | Kowalczyk et al. |
| 9,170,392 | B2 | 10/2015 | Krampotich et al. |
| 9,891,399 | B2 | 2/2018 | Krampotich et al. |
| 9,904,026 | B2 | 2/2018 | Burek et al. |
| 10,274,692 | B2 | 4/2019 | Abbiati et al. |
| 10,754,115 | B2 | 8/2020 | Van Baelen et al. |
| 10,782,499 | B2 | 9/2020 | Van Baelen et al. |
| 11,493,718 | B2 * | 11/2022 | Montena ............... G02B 6/4457 |
| 2001/0019002 | A1 | 9/2001 | Walters et al. |
| 2008/0011514 | A1 | 1/2008 | Zheng et al. |
| 2011/0262146 | A1 | 10/2011 | Khemakhem et al. |
| 2016/0238810 | A1 | 8/2016 | Hubbard et al. |
| 2017/0285286 | A1 | 10/2017 | Haile-Mariam et al. |
| 2017/0336587 | A1 | 11/2017 | Coan et al. |
| 2017/0357070 | A1 * | 12/2017 | Burek ................... G02B 6/4457 |
| 2018/0113268 | A1 | 4/2018 | Van Baelen et al. |

FOREIGN PATENT DOCUMENTS

| | | |
|---|---|---|
| TW | 200928473 A | 7/2009 |
| TW | 200931092 A | 7/2009 |
| WO | 2011116081 A1 | 9/2011 |

OTHER PUBLICATIONS

Written Opinion dated Jul. 20, 2020 in corresponding PCT Application No. PCT/US20/24337, 9 pages.
Extended European Search Report dated Nov. 8, 2022 in corresponding European Application No. 20773336.1, 9 pages.
Taiwanese Office Action dated Oct. 25, 2022 in corresponding Taiwanese Application No. 109109621, 5 pages.

* cited by examiner

MULTI-FIBER REEL AND ADAPTER ASSEMBLY

CROSS-REFERENCE TO RELATED APPLICATIONS

This application is continuation of U.S. application Ser. No. 16/827,545 filed on Mar. 23, 2020, which claims benefit and priority of U.S. Provisional Application No. 62/821,951 filed on Mar. 21, 2019, the disclosures of which are hereby incorporated herein in their entireties.

TECHNICAL FIELD

This disclosure relates generally the field of apparatuses for the installation of optical access networks. In particular, this disclosure relates to a reel and adapter assembly that is configured to breakout a plurality of fibers from a multi-fiber cable to a plurality of single fiber cables and to distribute the plurality of single fiber cables to multiple different locations.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a fiber distribution hub (FDH), which is typically located in the basement or vault of a multi-dwelling unit building in which the end users reside. A multi-fiber distribution cable typically leads out of the distribution hub to a fiber connection point that is typically located remote from the distribution hub. At the distribution hub, the distribution cable can be connected optically to one or more drop cables. As used herein, a "drop cable" is an optical fiber cable that typically runs towards an apartment or office of an end user. To connect the distribution cable to the drop cables, a number of optical fibers are broken out of the distribution cable and into a same number of single-fiber cables that are each terminated with an optical fiber connector. Each drop cable is then typically terminated in a termination box located in the proximity of or inside an apartment or office of an end user. A building may include a single FDH for the entire building, or one FDH per floor, or any combination in between, depending on the fiber connection needs and capacity of the building.

When installing an FDH, it is difficult for a technician to determine the length of input fiber cable needed to connect the FDH to a fiber connection point, which is usually outdoors where the connections to the larger fiber networks (e.g., a city wide fiber network) are made. In some installations, the fiber connection point could also be within the same building, perhaps on another floor or in the basement of the building. Regardless of the location of the fiber connection point, it is typically necessary to physically locate the FDH before the required length of input fiber cable between the FDT and the fiber connection point is known. As a result, the technician needs to approximate the length of input fiber cable to the fiber connection point and prepare that length of the input fiber cable before installing the FDH.

If the approximated length is too short, the technician must then splice the approximated length of input fiber cable with another length of input fiber cable. On the other hand, if the approximated length is too long, the excess slack of the input fiber cable must be stored somewhere along the length of fiber cable. If not properly stored, unwanted bends and thus unwanted bend loss can be introduced into the fiber cable path.

Although it is convenient for a technician to secure the FDH to its permanent location before connecting the input fiber cable to the fiber connection point, conventional FDHs include an adapter plate mounted to the spool of fiber cable such that the adapter plate will rotate with the spool when the input fiber cable is deployed from the spool to the fiber connection point. Thus, although the terminated breakout cables can be connected to the adapter plate before the input fiber cable is deployed from the spool to the fiber connection point, the drop cables that run from the FDH to an apartment or office of an end user cannot be connected until after the input fiber cable is deployed from the spool to the fiber connection point because the adapter plate rotates with the spool and would damage the drop cables.

Therefore, it may be desirable to provide a multi-fiber reel and adapter assembly that permits a technician to connect drop cables to the adapters in advance of the multi-fiber cable being deployed or paid out from the reel to a remote fiber connection of a FTTX application and keep the drop cables connected to the adapters while the reel is being rotated to deploy or pay out the multi-fiber cable to the remote fiber connection. It may also be desirable to provide a multi-fiber reel and adapter assembly that includes a reel that holds the multiple connectors of breakout cables that are broken out from the multi-fiber cable while the reel is being rotated to deploy or pay out the multi-fiber cable to the remote fiber connection.

SUMMARY

According to various embodiments of the disclosure, a multi-fiber reel and adapter assembly includes a base having a back wall and at least one side wall configured to define an interior, a cable reel mounted to the base, and a plurality of adapters fixedly mounted to the at least one side wall of the base. The cable reel is configured to be received in the interior of the base. The at least one side wall includes an opening configured to receive a distribution cable that includes the fiber optic cable, and the distribution cable is a multi-fiber cable wound on the cable reel. Each of the adapters is configured to couple a first fiber optic connector terminating a breakout cable from the multi-fiber cable with a second fiber optic connector terminating a fiber optic drop cable that is configured to run from the respective adapter to a location of an end user that is remote from the assembly. A first end of the distribution cable, opposite to the breakout cable, is configured to be paid out from the reel to a fiber connection located remotely from the assembly. The cable reel is configured to rotate relative to the base and the adapters while the fiber optic drop cables are coupled with the respective adapters. The cable reel includes a pair of reel flanges configured to extend radially outward from the outer rim portion, at least one of the reel flanges including an opening through which the distribution cable is configured to pass from a space between the reel flanges to a space outside of the reel flanges. One of the reel flanges includes a header portion configured to extend from an outer surface of the one reel flange that faces away from the back wall, the header portion being configured to rotate with the cable reel relative to the base. The header portion includes at least one pair of fingers that extend in a direction away from the outer surface of the one reel flange, the pair of fingers being configured to receive and hold the breakout cable such that the breakout cable is configured to rotate with the reel relative to the base and the adapters.

In some aspects of the assembly, a bearing mount extends from the back wall into the interior and is configured to rotatably receive a hub portion of the cable reel.

According to some embodiments, a multi-fiber reel and adapter assembly includes a base having a back wall and at least one side wall configured to define an interior, a cable reel mounted to the base, and a plurality of adapters fixedly mounted to the at least one side wall of the base. The cable reel is configured to be received in the interior of the base. The at least one side wall includes an opening configured to receive a distribution cable that includes the fiber optic cable, and the distribution cable is a multi-fiber cable wound on the cable reel. Each of the adapters is configured to couple a first fiber optic connector terminating a breakout cable from the multi-fiber cable with a second fiber optic connector terminating a fiber optic drop cable that is configured to run from the respective adapter to a location of an end user that is remote from the assembly. A first end of the distribution cable, opposite to the breakout cable, is configured to be paid out from the reel to a fiber connection located remotely from the assembly. The cable reel is configured to rotate relative to the base and the adapters while the fiber optic drop cables are coupled with the respective adapters.

In some aspects of the assembly, the cable reel includes a pair of reel flanges configured to extend radially outward from the outer rim portion, at least one of the reel flanges including an opening through which the distribution cable is configured to pass from a space between the reel flanges to a space outside of the reel flanges.

In various aspects of the assembly, one of the reel flanges includes a header portion configured to extend from an outer surface of the one reel flange that faces away from the back wall, the header portion being configured to rotate with the cable reel relative to the base.

According to some aspects of the assembly, the header portion includes at least one pair of fingers that extend in a direction away from the outer surface of the one reel flange, the pair of fingers being configured to receive and hold the breakout cable such that the breakout cable is configured to rotate with the reel relative to the base and the adapters.

According to various embodiments, a multi-fiber reel and adapter assembly includes a base, a cable reel mounted to the base, and a plurality of adapters fixedly mounted to the base. The cable reel is configured to rotate relative to the base and the adapters, and each of the adapters is configured to couple a fiber optic cable from the cable reel with a fiber optic drop cable that is configured to run from the respective adapter to a location of an end user that is remote from the assembly.

In some aspects of the assembly, the base includes a back wall and at least one side wall configured to define an interior configured to receive the cable reel.

According to various aspects of the assembly, the at least one side wall includes the plurality of adapters and an opening configured to receive a distribution cable that includes the fiber optic cable.

In various aspects of the assembly, the distribution cable is a multi-fiber cable, and the fiber optic cable is a breakout cable of the distribution cable.

According to some aspects of the assembly, a bearing mount extends from the back wall into the interior and is configured to rotatably receive a hub portion of the cable reel.

In some aspects of the assembly, the cable reel includes an outer rim portion radially outward relative to the hub portion and a pair of reel flanges configured to extend radially outward from the outer rim portion. The outer rim portion is configured to receive the distribution cable wound thereon, and at least one of the reel flanges including an opening through which the distribution cable passes from a space between the reel flanges to a space outside of the reel flanges.

According to various aspects of the assembly, a length of the distribution cable is configured to be retained on the outer surface of the one reel flange by a plurality of retaining members that extend from the outer surface of the one reel flange in a direction away from the back wall.

In various aspects of the assembly, one of the reel flanges includes a header portion extends from an outer surface of the one reel flange that faces away from the back wall, and the header portion being configured to rotate with the cable reel relative to the base.

In some aspects of the assembly, the one reel flange includes a mount portion configured to receive the header portion.

According to some aspects of the assembly, the header portion includes at least one pair of fingers that extend in a direction away from the outer surface of the one reel flange, the pair of fingers being configured to receive and hold the breakout cable such that the breakout cable is configured to rotate with the reel relative to the base.

According to various aspects of the assembly, the distribution cable is wound onto the reel, and a first end of the distribution cable is configured to be paid out from the reel to a fiber connection located remotely from the assembly.

In some aspects of the assembly, each of the plurality of adapters is configured to couple a first fiber optic connector terminating the fiber optic cable and a second fiber optic connector terminating the drop cable.

According to various aspects of any of the aforementioned assemblies, the first fiber optic connector and the second fiber optic connector are SC connectors, ST connectors, LC connectors, MU connectors, or MPO connectors.

BRIEF DESCRIPTION OF THE FIGURES

For a further understanding of the invention, reference will be made to the following detailed description of the invention which is to be read in connection with the accompanying drawing and in which like numbers refer to like parts, wherein.

DETAILED DESCRIPTION

As a preface to the detailed description, it should be noted that, as used in this specification and the appended claims, the singular forms "a", "an" and "the" include plural referents, unless the context clearly dictates otherwise.

FIGS. 1-5 illustrate an exemplary reel and adapter assembly 100 for a multi-fiber cable in accordance with various aspects of the disclosure. As shown in the embodiment of FIGS. 1-5, the reel and adapter assembly 100 includes a base 102, an adapter plate 120, and a cable reel 130. The base 102 includes a back wall 104 and four side walls 106, 108, 110, 112. The back wall 104 and the four side walls 106, 108, 110, 112 define an interior 114, which is configured to receive the cable reel 130. A bearing mount 116 extends from the back wall 104 into the interior 114 and is configured to rotatably receive the cable reel 130. It should be appreciated that, in some aspects, the base 102 can be closed by a door or panel (not shown) if it is desired to prevent access to the interior 114 of the base 102 and/or if it is desired to shield the interior 114 of the base 102 from the environment (e.g., dust, moisture, etc.).

In the embodiment of FIGS. 1-5, the first wall 106 defines the adapter plate 120. The adapter plate 120 includes a plurality of adapters 122 that are each configured to couple a pair of fiber optic connectors. In the embodiment shown in the figures, the adapters 122 are configured to couple SC connectors. However, in various aspects, the adapters 122 may be configured to couple any fiber optic connector, including but not limited to ST, LC, MU, and MPO connectors. The first wall 106 also includes an opening 124 configured to receive a cable such as, for example, a multi-fiber cable 190. Each adapter 122 includes a first end 126 configured to receive a connector 192 of one of the breakout cables 196 (described in more detail below) broken out from the multi-fiber cable 190 and a second end 128 configured to receive a connector of a drop cable (not shown) that runs from the adapter plate 120 towards an apartment or office of an end user.

The reel 130 includes a hub portion 132 having a radially inner surface 134, an outer rim portion 136, and a pair of reel flanges 138, 139 extending radially outward from the outer rim portion 136. The radially inner surface 134 is sized such that the reel 130 can be rotatably mounted to the bearing mount 116 so as to rotate about an axis X that extends through the bearing mount 116. That is, the diameter of the radially inner surface 134 is greater than the outer diameter of the bearing mount 116 by an amount that permits the reel 130 to rotate relative to the bearing mount 116. In some aspects, the radially inner surface 134 can be substantially the same as the outer diameter of the bearing mount 116.

The outer rim portion 136 defines an outer circumferential surface 140 about which the cable 190 can be wound. The reel flanges 138, 139 prevent the cable 190 from sliding off the outer rim portion 136 in the axial direction of the reel 130. The reel flanges 138, 139 may include one or more openings 142 through which the cable 190 can pass from a space between the reel flanges 138, 139 to a space outside of the reel flanges 138, 139 in the axial direction of the reel 130, as illustrated in FIGS. 1-5.

As illustrated, the reel flange 139 is adjacent the back wall 104, and the reel flange 138 is spaced from the reel flange 139 and the back wall 104 in the interior 114 of the assembly 100. A latching member 105 may be configured to selectively limit rotation of the reel 130 relative to the back wall 104. For example, the latching member 105 may be integral with the back wall 104 and/or one of the side walls, for example, side wall 108. That is, the latching member 105 may be monolithically constructed with the back wall 104 and/or the side wall 108, or the latching member 105 may be constructed separately from the back wall 104 and the side wall 108 and then fixedly coupled with the back wall 104 and/or the side wall 108. The latching member 105 may be configured to selectively extend through one of the openings 142 of the reel flange 139 to restrict rotation of the reel 130 relative to the latching member 105, back wall 104, and side wall 108 to the arcuate length of the opening 142.

A header portion 144 extends from an outer surface 146 of the reel flange 138 that faces away from the back wall 104. In some aspects, the header portion 144 extends substantially perpendicular to the reel flange 138 in a direction parallel to the axial direction of the reel 130. It should be appreciated that the header portion 144 can be an integral monolithic structure with the reel flange 138 in some embodiments. In other embodiments, the header portion 144 can be removably attached to the reel flange 138. For example, as shown in the drawings, in an exemplary embodiment, the reel flange 138 can include a mount portion 148 configured to receive the header portion 144. The header portion 144 can be fixedly attached to the mount portion 148 by any conventional attachment mechanism, including but not limited to a friction fit, a snap fit, a fastener, etc.

Figure 1:
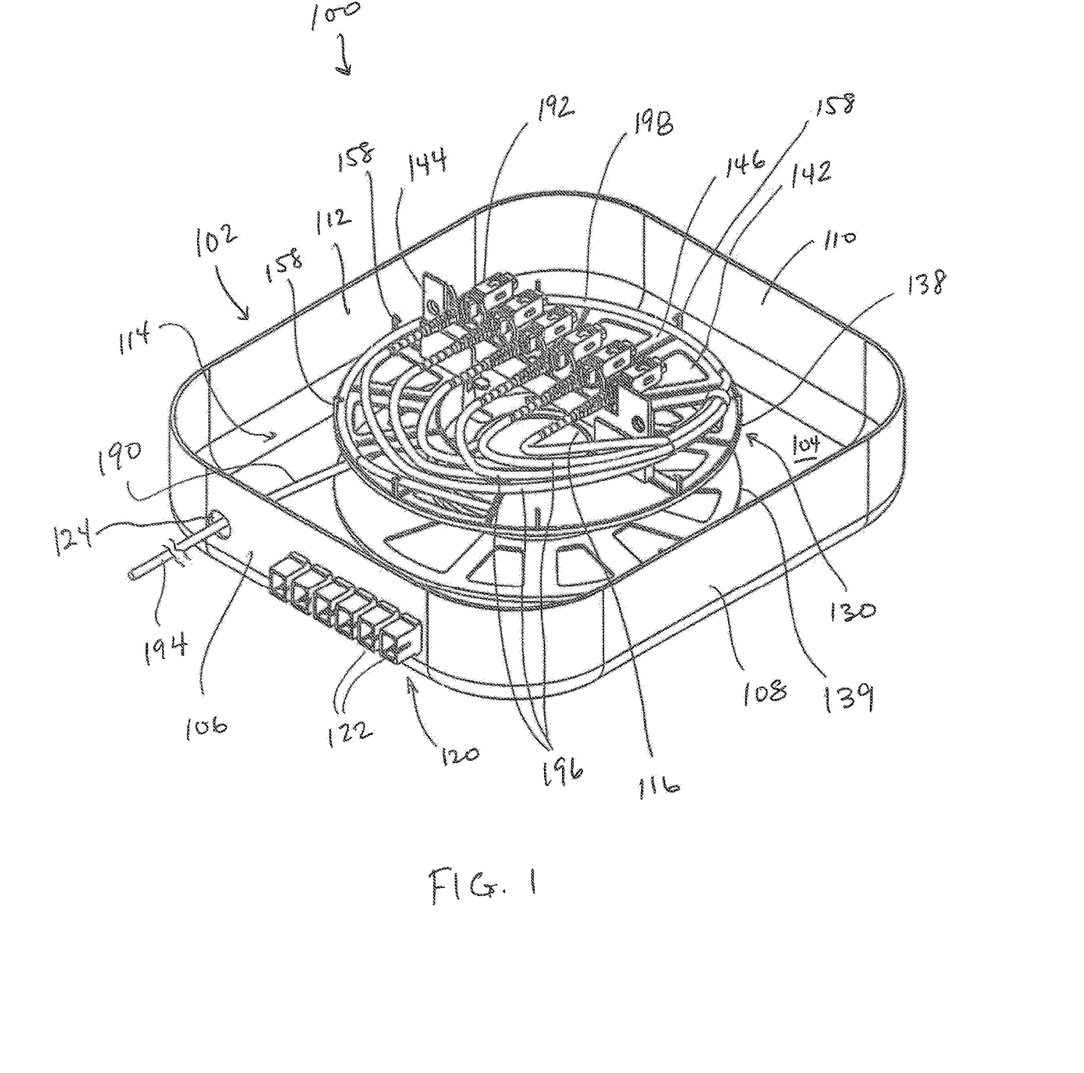
FIG. 1 is a first perspective view of an exemplary reel and adapter assembly for a multi-fiber cable in accordance with various aspects of the disclosure.
Figure 2:
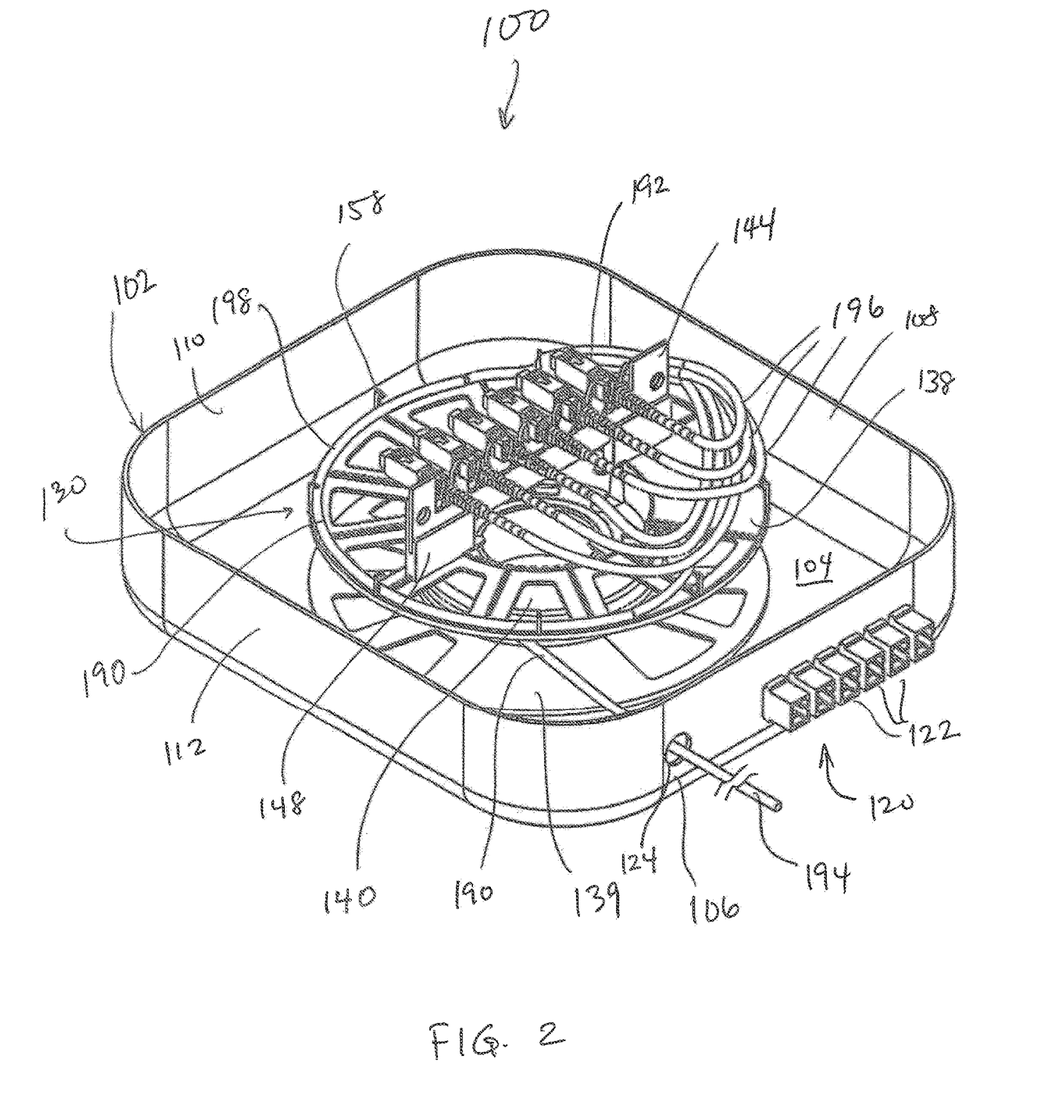
FIG. 2 is a second perspective view of the reel and adapter assembly of FIG. 1.
Figure 3:
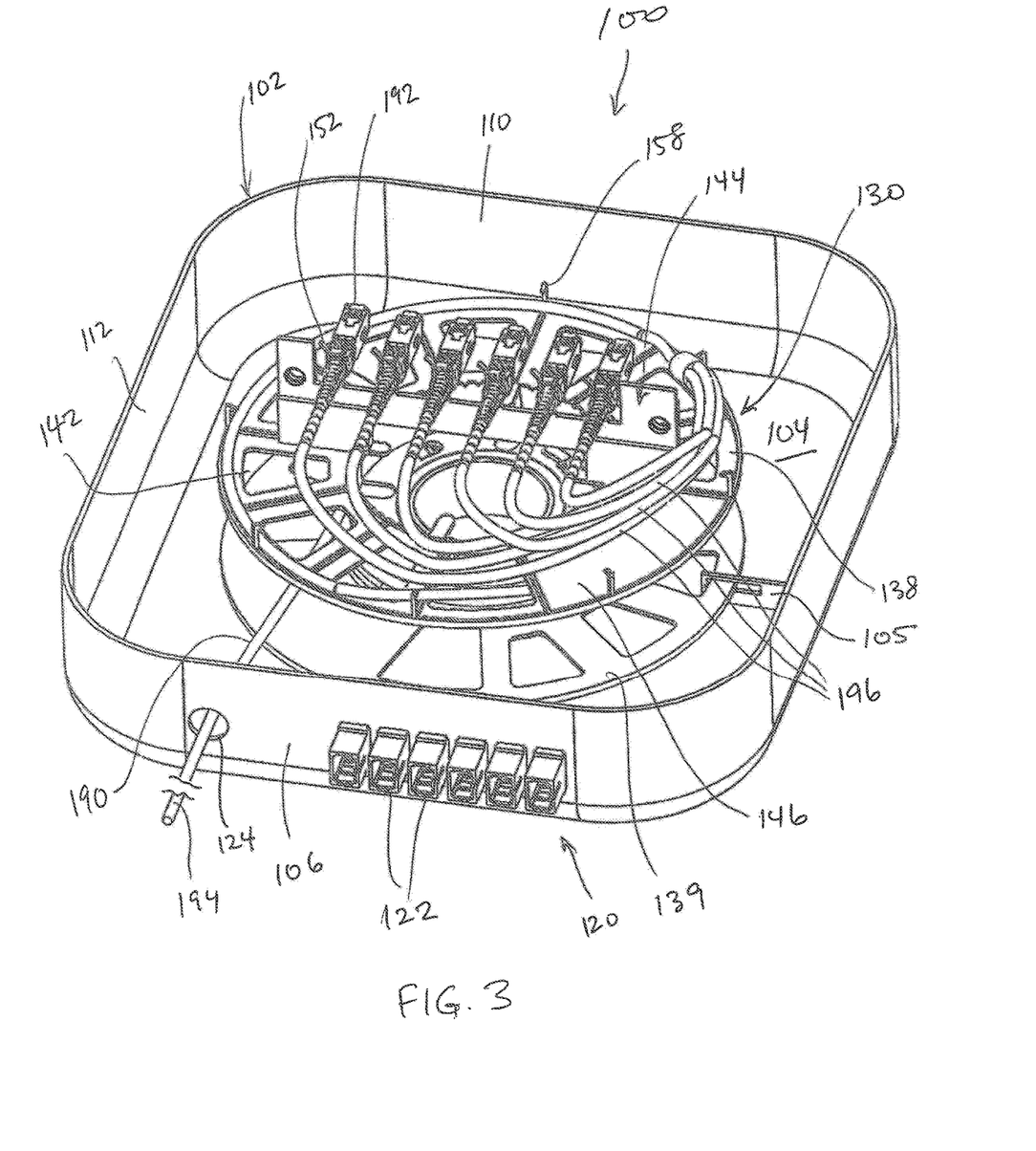
FIG. 3 is a third perspective view of the reel and adapter assembly of FIG. 1 with a locking member in a locked position.
Figure 4:
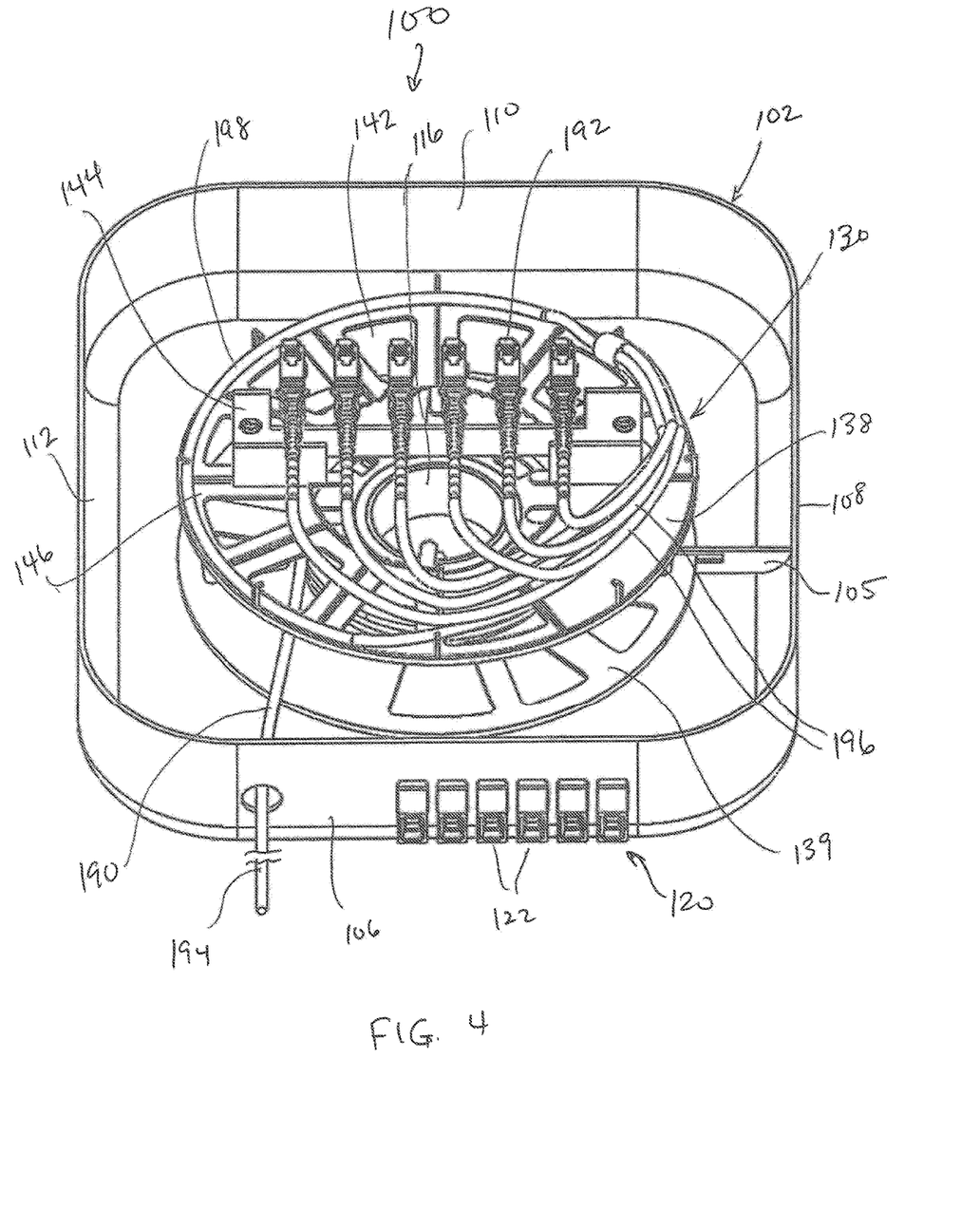
FIG. 4 is a fourth perspective view of the reel and adapter assembly and the locking member of FIG. 3.
Figure 5:
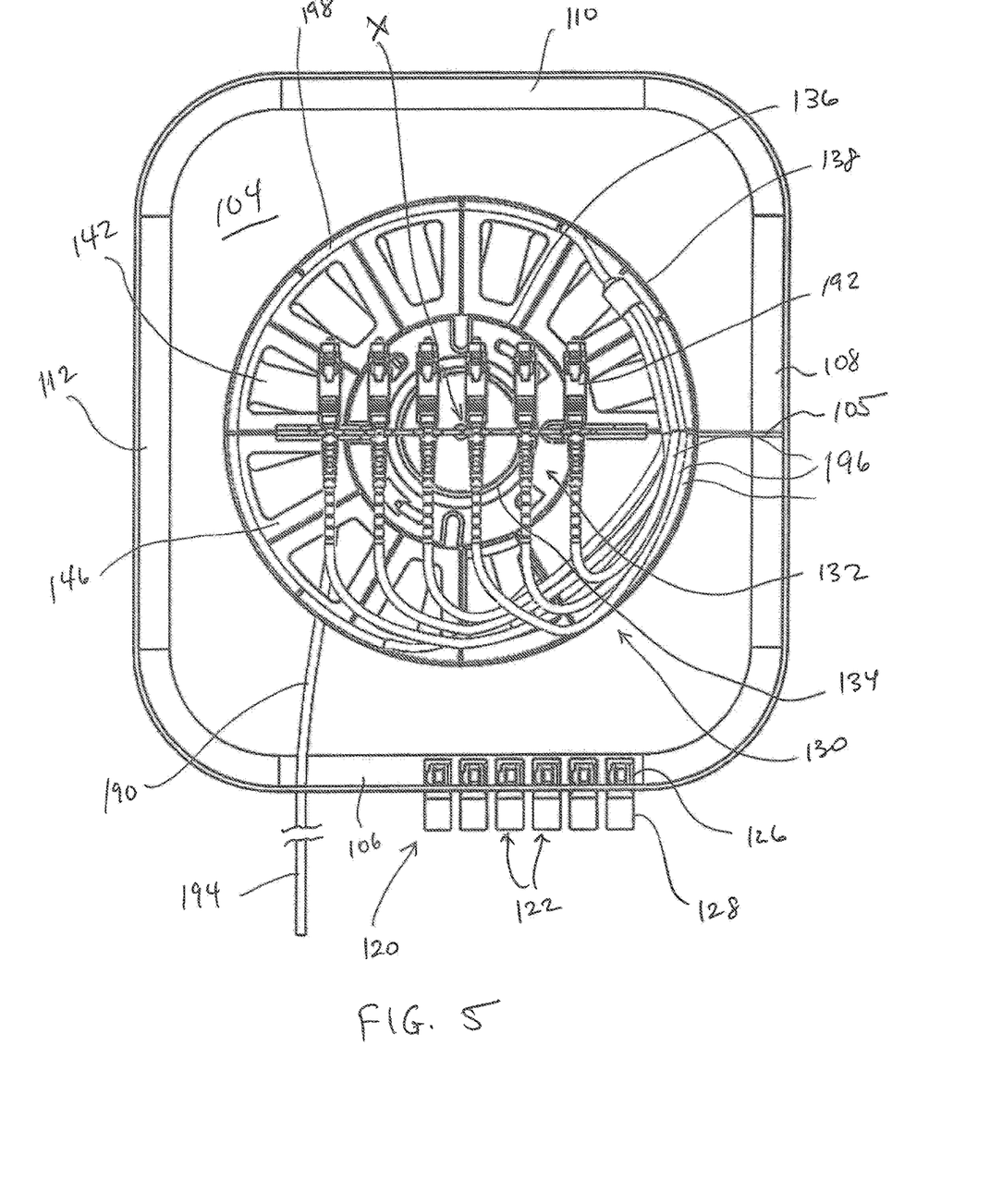
FIG. 5 is a top view of the reel and adapter assembly and the locking member of FIG. 3.
Figure 6:
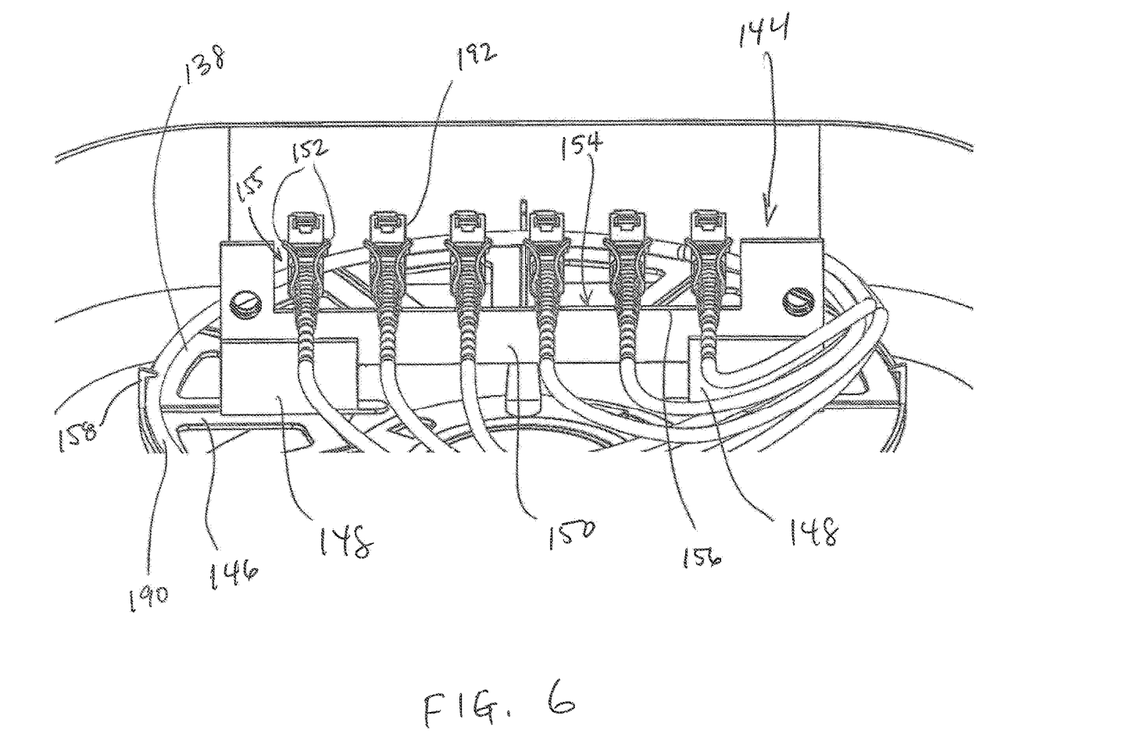
FIG. 6 is an enlarged perspective view of a header of the reel and adapter assembly of FIG. 1.
Figure 7:
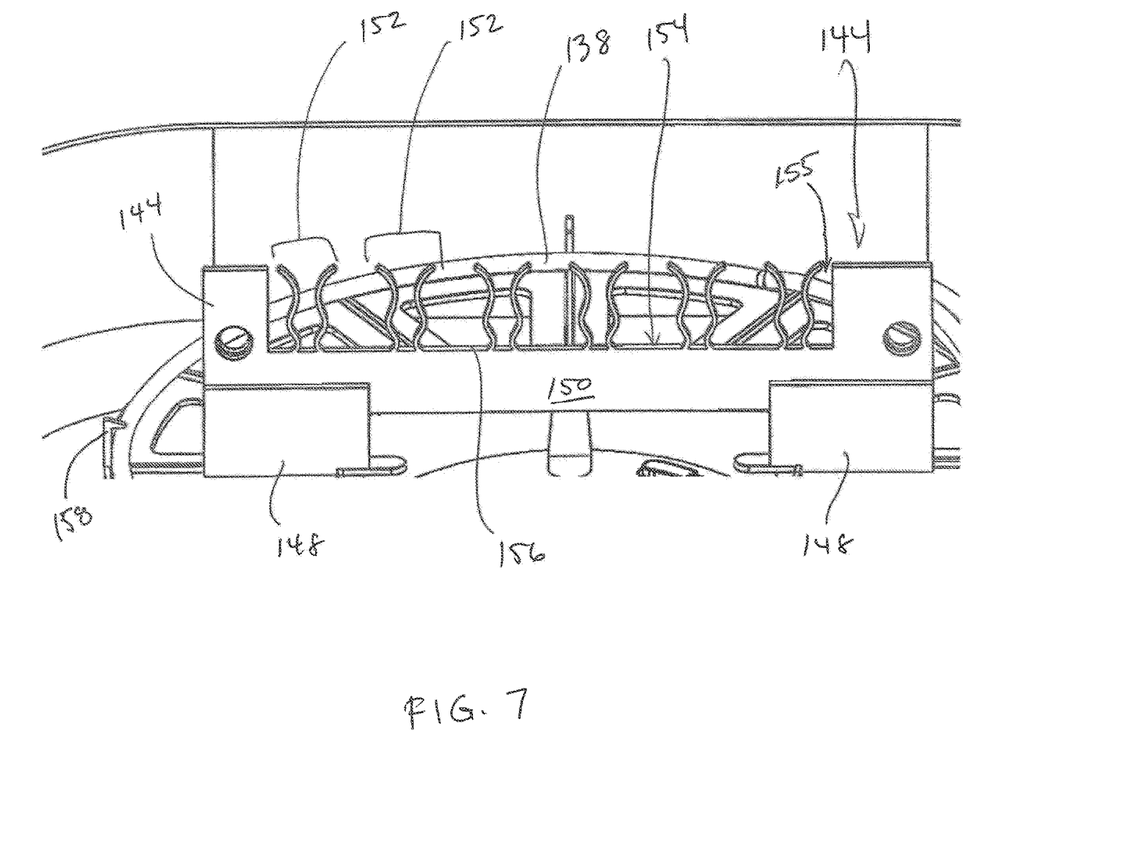
FIG. 7 is an enlarged perspective view of the header of FIG. 6 without cables.

Referring now to FIGS. 6 and 7, an exemplary embodiment of the header portion 144 is shown in detail. The header portion 144 includes a plate portion 150 and a plurality of pairs of fingers 152 that extend from the plate portion 150 in a direction away from the surface 146 of the reel flange 138. Each pair of fingers 152 is configured to receive and hold a connector 192, for example, a fiber optic connector such as the SC connectors shown in the drawings. For example, in the illustrated exemplary embodiment, each pair of fingers 152 and is structured and arranged such that the fingers can bend or deflect away from one another when receiving a portion, for example, a boot portion, of the connector 192. That is, the pairs of fingers 152 may be resilient fingers.

As shown, the fingers of each pair of fingers 152 are curved in opposite directions such that some regions of the pair of fingers 152 are closer to one another than other regions. As a result, when the connector 192 is received by the pair of fingers 152, the fingers 152 are urged away from one another when the connector 192 passes through the closer regions and then return toward their original configurations after the connector 192 passes through the closer regions and is disposed in a more spaced apart region. As also illustrated, the plate portion 150 of the header portion 144 includes a U-shaped cutout region 154 in the direction perpendicular to the reel flange 138, with the pairs of fingers 152 extending from a base 156 of the cutout region 154 into an opening 155 of the cutout region 154.

As shown in FIGS. 1-6, the cable 190 is a multi-fiber cable that is wound onto the reel 130. A first end 194 of the cable 190 is arranged on the reel 130 so that the first end 194 can be deployed or paid out from the reel 130 to a remote fiber connection of a FTTX application. In the illustrated exemplary embodiment, the multi-fiber cable 190 includes six fibers, and the six fibers are broken out from a second end of the cable 190 into six single-fiber breakout cables 196, as would be understood by persons of ordinary skill in the art.

The multi-fiber cable 190 extends from a space between the reel flanges 138, 139 through one of the openings 142 and to a space outside of the reel flange 138 where the fibers of the cable 190 are broken out into the six single-fiber breakout cables 196. A length 198 of the cable 190 is disposed in the space outside the reel flange 138 to provide slack for connecting the breakout cables 196 to the adapters 122 of the adapter plate 120. The slack length 198 of the cable 190 is retained on the outer surface 146 of the reel flange 138 by a plurality of retaining members 158 that extend from the outer surface 146 of the reel flange 138 in a direction away from the back wall 104. The plurality of retaining members 158 define a slack storage path along which the slack length 198 can be wound and prevent the slack length 198 from unwinding in a radially outward direction from the reel flange 138. The breakout cables 196 each have a length that enables the connectors 192 that terminate the breakout cables 196 to be received by the pairs of fingers 152.

In use, the reel 130 is mounted on the bearing mount 116 and includes the wound multi-fiber cable 190, the slack length 198 of the cable 190 in the space outside of the reel flange 138, and the connectors 192 of the breakout cables 196 securely received by the fingers 152 of the header portion 144. A technician can then pay out the multi-fiber cable 190 from the reel 130 by grasping the first end 194 of the cable 190, passing the first end 194 through the opening 124 in the first wall 106, and deploying the first end 194 of the cable 190 to a desired remote fiber connection of a FTTX application. The reel 130 rotates relative to the adapter plate 120 since the adapter plate 120 is fixed to the base 102. As a result, the reel and adapter assembly 100 permits a technician to connect drop cables from the adapter plate 120 to an apartment or office of an end user in advance of the multi-fiber cable 190 being deployed or paid out from the reel to a remote fiber connection of a FTTX application. Because the reel 130 rotates while the adapter plate remains stationary, the technician can keep the drop cables connected to the adapters 122 while the reel 130 is being rotated to deploy or pay out the multi-fiber cable 190 to the remote fiber connection. Meanwhile, the reel 130 holds the multiple connectors 192 of breakout cables 196 that are broken out from the multi-fiber cable 190 while the reel 130 is being rotated to deploy or pay out the multi-fiber cable 190 to the remote fiber connection.

It should be understood that, although the illustrated embodiment includes a multi-fiber cable 190 having six fibers and six breakout cables 196, the multi-fiber cable 190 can include any number of fibers and breakout cables such as, for example, 12, 24, etc. In other embodiments, the assembly 100 can include multiple fiber connectors held together, rather than individually, such that the multiple fiber connectors can be removed and plugged in simultaneously.

In some aspects, the assembly 100 can include the base 102 having the back wall 104 for rotatably receiving the reel 130 and only the one wall 106 that defines the adapter plate 120 with the adapters 122. In such an embodiment, it may not be necessary to provide the opening 124 for receiving the cable 190.

In still other aspects, the assembly 100 can include the reel 130 mounted directly to a wall or surface and the adapters 122 also mounted to the wall or surface near the reel 130. In such an embodiment, the wall or surface may include the bearing mount 116 and the adapters 122 can be mounted on an adapter plate 120, which is, in turn, mounted to the wall or surface.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A cable reel and adapter assembly comprising:
   a base portion;
   a cable reel configured to be coupled to the base portion;
   an adapter portion configured to be coupled to the base portion;
   wherein the cable reel includes a mount portion that receives a header portion that is configured to extend from an outer surface of the cable reel, be coupled to a plurality of breakout cables each having a connector, and rotate with the cable reel relative to the base portion during operation of the assembly;
   wherein the cable reel is configured to rotate relative to the adapter portion when the adapter portion is coupled to the base portion such that the adapter portion does not rotate with the cable reel during operation of the assembly;
   wherein the adapter portion is configured to optically couple a connectorized end of each of the breakout cables with a connectorized end of one of a plurality of fiber optic drop cables that are configured to extend to a remote end user location;
   wherein the header portion includes a plurality of finger portions each having a pair of fingers, wherein each pair of fingers is configured to receive and directly contact a portion of one of the connectors; and
   wherein each finger portion is configured to receive and hold one of the breakout cables such that the breakout cables are configured to rotate with the cable reel relative to the base during operation of the assembly.

2. The assembly of claim 1, wherein the base portion includes a back wall portion and a side wall portion that is configured to define an interior portion that is configured to receive the cable reel.

3. The assembly of claim 2, wherein the side wall portion comprises the adapter portion.

4. The assembly of claim 2, wherein the side wall portion comprises a plurality of side wall portions.

5. The assembly of claim 1, wherein the finger portion comprises a plurality of fingers.

6. The assembly of claim 1, wherein the adapter portion comprises a plurality of fiber optic adapters that are each structurally configured to include a first end extending from a first side of a side wall portion of the base portion and structurally configured to receive a first fiber optic connector and a second end extending from a second side of the side wall portion, opposite to the first side, and structurally configured to receive a second fiber optic connector.

7. The assembly of claim 6, wherein the fiber optic adapter is structurally configured to couple the first fiber optic connector that terminates a first fiber optic cable at an interior of the base portion with the second fiber optic cables that terminate a second fiber optic cable at an exterior of the base portion.

8. The assembly of claim 7, wherein the header portion, the finger portion, and the first fiber optic connector held by the finger portion are structurally configured to rotate with the cable reel relative to the fiber optic adapter portion and the second fiber optic connector that is received in the second end of the fiber optic adapter portion such that the first fiber optic cable terminated by the first fiber optic connector rotates with the cable reel, and the second fiber optic cable terminated by the second fiber optic connector does not rotate with the cable reel.

9. A cable reel and adapter assembly comprising:
a base portion;
a cable reel structurally configured to be coupled with the base portion;
a fiber optic adapter portion structurally configured to couple fiber optic connectors;
wherein a side wall portion of the base portion comprises the fiber optic adapter portion;
wherein the fiber optic adapter portion includes a first end portion extending from a first side of the side wall portion and structurally configured to receive a plurality of first fiber optic connectors and a second end portion extending from a second side of the side wall portion, opposite to the first side, and structurally configured to receive a plurality of second fiber optic connectors;
wherein the cable reel includes a header portion that is structurally configured to extend from an outer surface portion of the cable reel, be coupled to a plurality of fiber cables each being terminated by a connector, and rotate with the cable reel relative to the base portion during operation of the assembly;
wherein the cable reel is structurally configured to rotate relative to the side wall portion that comprises the fiber optic adapter portion such that the fiber optic adapter does not rotate with the cable reel during operation of the assembly;
wherein the fiber optic adapter portion is structurally configured to couple the first fiber optic connectors, which terminate a plurality of first fiber optic cables disposed at an interior portion of the base portion, with the second fiber optic connectors, which terminates a plurality of second fiber optic cables disposed at an exterior of the base portion;
wherein the header portion includes a connector holding portion that is structurally configured to receive and hold the plurality of first fiber optic connectors; and
wherein the header portion, the connector holding portion, and the plurality of first fiber optic connectors held by the connector holding portion are structurally configured to rotate with the cable reel relative to the fiber optic adapter portion and the plurality of second fiber optic connectors that are received in the second end of the fiber optic adapter portion such that the first fiber optic cables terminated by the first fiber optic connectors rotate with the cable reel, and the second fiber optic cables terminated by the second fiber optic connectors do not rotate with the cable reel.

10. The assembly of claim 9, wherein the connector holding portion comprises a pair of fingers; and
wherein the pair of fingers is structurally configured to receive and directly contact a portion of a fiber optic connector.

11. The assembly of claim 9, wherein the base portion includes a back wall portion and a side wall portion that are structurally configured to define the interior portion that is structurally configured to receive the cable reel.

12. The assembly of claim 11, wherein the side wall portion comprises a plurality of side wall portions.

13. A cable reel and adapter assembly comprising:
a base portion comprising a fiber optic adapter portion;
a cable reel structurally configured to be coupled with the base portion;
wherein the cable reel includes a connector holding portion that is structurally configured to receive and hold a plurality of connectorized first fiber optic cables;
wherein the cable reel is structurally configured to rotate relative to the base portion that comprises the fiber optic adapter portion such that the fiber optic adapter portion does not rotate with the cable reel;
wherein the fiber optic adapter portion is structurally configured to couple a plurality of first fiber optic connectors, which terminate the first fiber optic cables disposed at an interior portion of the base portion, with a plurality of second fiber optic connectors, which terminates second fiber optic cables disposed at an exterior of the base portion; and
wherein the connector holding portion and the first fiber optic connectors held by the connector holding portion are structurally configured to rotate with the cable reel relative to the fiber optic adapter portion and the second fiber optic connectors that are received in the second end of the fiber optic adapter portion such that the first fiber optic cables terminated by the first fiber optic connectors rotate with the cable reel and the second fiber optic cables terminated by the second fiber optic connectors do not rotate with the cable reel.

14. The assembly of claim 13, wherein the connector holding portion comprises a pair of fingers; and
wherein the pair of fingers is structurally configured to receive and directly contact a portion of a fiber optic connector.

15. The assembly of claim 13, wherein connector holding portion is structurally configured to extend from an outer surface of the cable reel.

16. The assembly of claim 13, wherein the base portion includes a back wall portion and a side wall portion that are structurally configured to define the interior portion that is structurally configured to receive the cable reel; and
wherein the side wall portion comprises the fiber optic adapter portion.

17. The assembly of claim 16, wherein the side wall portion comprises a plurality of side wall portions.

18. The assembly of claim 16, wherein the fiber optic adapter portion includes a first end portion extending from a first side of the side wall portion to the interior portion and a second end portion extending from a second side of the side wall portion, opposite to the first side, to an exterior of the base portion.

19. The assembly of claim 18, wherein the first end portion is structurally configured to receive the first fiber optic connector and the second end portion is structurally configured to receive the second fiber optic connector.

20. The assembly of claim 13, wherein the cable reel is structurally configured to rotate relative to the fiber optic adapter portion such that the fiber optic adapter portion does not rotate with the cable reel during operation of the assembly.

\* \* \* \* \*